US008365266B2

(12) United States Patent
Bogner

(10) Patent No.: US 8,365,266 B2
(45) Date of Patent: Jan. 29, 2013

(54) TRUSTED LOCAL SINGLE SIGN-ON

(75) Inventor: Etay Bogner, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 12/052,336

(22) Filed: Mar. 20, 2008

(65) Prior Publication Data
US 2008/0235779 A1 Sep. 25, 2008

Related U.S. Application Data

(60) Provisional application No. 60/919,820, filed on Mar. 22, 2007.

(51) Int. Cl.
H04L 29/06 (2006.01)

(52) U.S. Cl. .......................................... 726/8

(58) Field of Classification Search .................. 726/8, 2, 726/5; 713/155, 168, 182; 709/217
See application file for complete search history.

(56) References Cited

U.S. PATENT DOCUMENTS

| | | | |
|---|---|---|---|
| 6,167,448 A | 12/2000 | Hemphill et al. | |
| 6,859,878 B1 * | 2/2005 | Kerr et al. | 713/183 |
| 6,931,446 B1 | 8/2005 | Cox et al. | |
| 7,036,006 B2 | 4/2006 | Bandhole et al. | |
| 7,047,377 B2 | 5/2006 | Elder et al. | |
| 7,107,463 B2 | 9/2006 | England et al. | |
| 7,210,169 B2 | 4/2007 | Smith et al. | |
| 7,269,632 B2 | 9/2007 | Edeker et al. | |
| 7,284,054 B2 | 10/2007 | Radhakrishnan | |
| 7,302,698 B1 | 11/2007 | Proudler et al. | |
| 7,330,981 B2 | 2/2008 | Willman | |
| 7,516,457 B2 | 4/2009 | Eilam et al. | |
| 7,558,864 B2 | 7/2009 | Kalantar et al. | |
| 7,593,413 B2 | 9/2009 | Raisch | |
| 7,647,589 B1 | 1/2010 | Dobrovolskiy et al. | |
| 7,698,660 B2 | 4/2010 | Sanchez et al. | |
| 7,756,981 B2 | 7/2010 | Shastri et al. | |
| 8,150,941 B2 | 4/2012 | Edecker et al. | |
| 2002/0029276 A1 | 3/2002 | Bendinelli et al. | |
| 2002/0119427 A1 | 8/2002 | Brown et al. | |
| 2002/0188678 A1 | 12/2002 | Edecker et al. | |
| 2002/0194482 A1 | 12/2002 | Griffin et al. | |

(Continued)

FOREIGN PATENT DOCUMENTS

WO 2008/018055 2/2008
WO 2008114257 A2 9/2008

OTHER PUBLICATIONS

International Application PCT/IL2008/00382 Search Report dated Jan. 5, 2009.

(Continued)

Primary Examiner — Ali Abyaneh
(74) Attorney, Agent, or Firm — Blakely, Sokoloff, Taylor & Zafman LLP

(57) ABSTRACT

A method includes running on a computer a first operating environment for performing general-purpose operations and a second operating environment, which is configured exclusively for interacting with multiple servers in respective secure communication sessions and is isolated from the first operating environment. Multiple server-specific credentials for authenticating a user of the computer to the respective servers, as well as a single set of master credentials for authenticating the user to the second operating environment, are stored in the second operating environment.

A secure communication session is established between the computer and a given server under control of a program running in the second operating environment, by authenticating the user using the master credentials and, responsively to authenticating the user, selecting one of the server-specific credentials and authenticating the user to the given server using the selected server-specific credentials.

25 Claims, 3 Drawing Sheets

U.S. PATENT DOCUMENTS

| | | | |
|---|---|---|---|
| 2002/0194496 | A1 | 12/2002 | Griffin et al. |
| 2003/0018913 | A1 | 1/2003 | Brezak et al. |
| 2003/0084348 | A1 | 5/2003 | Miyao et al. |
| 2003/0167410 | A1 | 9/2003 | Rigstad et al. |
| 2003/0172109 | A1 | 9/2003 | Dalton et al. |
| 2003/0188193 | A1* | 10/2003 | Venkataramappa .......... 713/201 |
| 2003/0202522 | A1 | 10/2003 | Jiang |
| 2004/0054901 | A1 | 3/2004 | England et al. |
| 2004/0088536 | A1 | 5/2004 | Lim et al. |
| 2004/0139141 | A1 | 7/2004 | Lessard |
| 2004/0172574 | A1 | 9/2004 | Wing et al. |
| 2005/0033980 | A1 | 2/2005 | Willman et al. |
| 2005/0114683 | A1 | 5/2005 | Jin et al. |
| 2005/0125537 | A1 | 6/2005 | Martins et al. |
| 2005/0132031 | A1 | 6/2005 | Sailer et al. |
| 2005/0132229 | A1 | 6/2005 | Zhang et al. |
| 2005/0144447 | A1 | 6/2005 | England et al. |
| 2005/0183143 | A1 | 8/2005 | Anderholm et al. |
| 2005/0221766 | A1 | 10/2005 | Brizek et al. |
| 2005/0223221 | A1 | 10/2005 | Proudler et al. |
| 2006/0017953 | A1 | 1/2006 | Ly et al. |
| 2006/0053215 | A1 | 3/2006 | Sharma |
| 2006/0136910 | A1 | 6/2006 | Brickell et al. |
| 2006/0230438 | A1* | 10/2006 | Shappir et al. .................... 726/8 |
| 2007/0044143 | A1 | 2/2007 | Zhu et al. |
| 2007/0050484 | A1 | 3/2007 | Oertig et al. |
| 2007/0061887 | A1 | 3/2007 | Hoover et al. |
| 2007/0089111 | A1 | 4/2007 | Robinson et al. |
| 2007/0094503 | A1* | 4/2007 | Ramakrishna ................ 713/172 |
| 2007/0101400 | A1 | 5/2007 | Freeman et al. |
| 2007/0112774 | A1 | 5/2007 | Cheshire |
| 2007/0129987 | A1* | 6/2007 | Hauser et al. ..................... 705/9 |
| 2007/0143629 | A1 | 6/2007 | Hardjono et al. |
| 2007/0168375 | A1 | 7/2007 | Yu |
| 2007/0192836 | A1 | 8/2007 | Shiran et al. |
| 2007/0260866 | A1 | 11/2007 | Wang et al. |
| 2007/0261125 | A1 | 11/2007 | Ginter et al. |
| 2007/0271618 | A1 | 11/2007 | Chao et al. |
| 2007/0300220 | A1 | 12/2007 | Seliger et al. |
| 2008/0040470 | A1 | 2/2008 | Bogner |
| 2008/0040478 | A1 | 2/2008 | Bogner et al. |
| 2008/0046738 | A1 | 2/2008 | Galloway et al. |
| 2008/0059804 | A1 | 3/2008 | Shah et al. |
| 2008/0101223 | A1 | 5/2008 | De Los Reyes |
| 2008/0114844 | A1 | 5/2008 | Sanchez et al. |
| 2008/0209544 | A1 | 8/2008 | Kempka |
| 2008/0222280 | A1 | 9/2008 | Lippincott et al. |
| 2008/0235779 | A1 | 9/2008 | Bogner |
| 2008/0235794 | A1 | 9/2008 | Bogner |
| 2009/0043971 | A1 | 2/2009 | Kim |
| 2009/0049297 | A1 | 2/2009 | Omernick et al. |
| 2009/0049510 | A1 | 2/2009 | Zhang et al. |
| 2009/0100272 | A1 | 4/2009 | Smeets |
| 2009/0164377 | A1 | 6/2009 | Aissi |
| 2009/0276783 | A1 | 11/2009 | Johnson et al. |
| 2010/0154037 | A1 | 6/2010 | Sabin et al. |
| 2010/0218236 | A1 | 8/2010 | Hardjono et al. |

OTHER PUBLICATIONS

Trusted Computing Group (TCG), "TPM Main Part 1 Design Principles", Specification Version 1.2 Level 2 Revision 103, Jul. 9, 2007.
International Application PCT/IL2007/000954 Preliminary Report on Patentability dated Apr. 23, 2009.
International Application PCT/IL2007/000954 Search Report dated Aug. 5, 2008.
International Application PCT/IL2007/000019 Search Report dated May 18, 2009.
Bogner, E., U.S. Appl. No. 12/477,167 "Secure multi-purpose computing client" filed Jun. 3, 2009.
Weiss et al., U.S. Appl. No. 12/348,357 "Stateless attestation system" filed Jan. 5, 2009.
International Application PCT/IB2009/052347 Search Report dated Oct. 20, 2009.
U.S. Appl. No. 11/835,995 Official Action dated Jan. 7, 2010.
U.S. Appl. No. 11/836,028 Official Action dated Dec. 12, 2009.
U.S. Appl. No. 11/836,028 Official Action dated Jun. 9, 2010.
Office Action from U.S. Appl. No. 12/052,246 mailed Feb. 17, 2011, 30 pages.
Office Action from U.S. Appl. No. 11/835,995 mailed Mar. 4, 2011, 18 pages.
Final Office Action from U.S. Appl. No. 11/835,995 mailed Jul. 22, 2010, 16 pages.
Office Action from U.S. Appl. No. 11/836,028 mailed Dec. 21, 2010.
Final Office Action from U.S. Appl. No. 11/836,028 mailed Jun. 7, 2011, 18 pages.
Final Office Action from U.S. Appl. No. 12/052,246 mailed Aug. 2, 2011, 18 pages.
Final Office Action from U.S. Appl. No. 11/835,995 mailed Aug. 17, 2011, 18 pages.
Final Office Action from U.S. Appl. No. 12/477,167 mailed Dec. 23, 2011, 27 pages.
Office Action from U.S. Appl. No. 12/348,357 mailed Nov. 28, 2011, 22 pages.
Office Action from U.S. Appl. No. 12/052,246 mailed Feb. 7, 2012, 20 pages.
Final Office Action from U.S. Appl. No. 12/477,167 mailed May 25, 2012, 15 pages.
Notice of Allowance from U.S. Appl. No. 12/052,246 mailed Jun. 21, 2012, 23 pages.
Office Action from U.S. Appl. No. 11/835,995 mailed Jul. 3, 2012, 19 pages.
European Search Report from European Application No. 09757979.1 mailed Jul. 5, 2012, 3 pages.
Office Action from European Application No. 09757979.1 mailed Jan. 12, 2011, 2 pages.
International Preliminary Report on Patentability from PCT/IL2009/000019 mailed Jul. 22, 2010, 7 pages.
Office Action from European Application No. 09757979.1 mailed Aug. 10, 2012, 5 pages.

* cited by examiner

TRUSTED LOCAL SINGLE SIGN-ON

CROSS-REFERENCE TO RELATED APPLICATIONS

This application claims the benefit of U.S. Provisional Patent Application 60/919,820, filed Mar. 22, 2007, whose disclosure is incorporated herein by reference.

FIELD OF THE INVENTION

The present invention relates generally to computer networks, and particularly to methods and systems for secure communication over data communication networks.

BACKGROUND OF THE INVENTION

Various applications allow users to interact with a computer system of an organization over the Internet or other public network. Such applications are often referred to as extranet applications. For example, extranet applications enable users to carry out financial transactions with organizations such as banks or insurance companies and make purchases using electronic commerce (e-commerce) web-sites. Employees can access organization data remotely over the Internet, and physicians can access medical records maintained by health institution database systems.

Communication security is often a prime consideration in the design and deployment of extranet applications, especially since extranet communication traffic traverses a public network and since user computers are often not under the control of the organization. Several methods and systems for increasing the security of extranet communication are known in the art. For example, U.S. Patent Application Publication 2002/0029276, whose disclosure is incorporated herein by reference, describes methods and systems for enabling a network connection between first and second processors using at least one additional processor separate from the first and second processors. As another example, U.S. Pat. No. 7,210,169, whose disclosure is incorporated herein by reference, describes an originator device, which allows for a unique pass-phrase to be communicated to a service system. The originator device has a fixed token, in which a unique platform identifier is recorded, and a processor that generates a representation of the platform configuration. The representation is communicated to a registry service as a unique, platform-specific pass-phrase associated with the originator.

Some security methods and systems attempt to verify the integrity of the operating environment of a server or user computer, i.e., verify that the operating environment has not been corrupted or tampered with. For example, U.S. Patent Application Publication 2005/0221766, whose disclosure is incorporated herein by reference, describes a method and apparatus for performing dynamic attestation for a communication system. Several methods for measuring and reporting the integrity of a system, such as a wireless device, are described. U.S. Patent Application Publication 2005/0132031, whose disclosure is incorporated herein by reference, describes a system and method for providing attestation and/or integrity of a server execution environment. One or more parts of the server environment are selected for measurement. The selected parts are measured, and the measurements result in a unique fingerprint for each selected part. The unique fingerprints are aggregated by an aggregation function to create an aggregated value, which is determinative of running programs in the server environment. A measurement parameter may include the unique fingerprints, the aggregated value or a base system value and may be sent over a network interface to indicate the server environment status or state.

SUMMARY OF THE INVENTION

Embodiments of the present invention provide a computing method, including:

running on a user computer a first operating environment for performing general-purpose operations and a second operating environment, which is configured exclusively for interacting with multiple servers in respective secure communication sessions and is isolated from the first operating environment;

storing in the second operating environment multiple server-specific credentials for authenticating a user of the user computer to the respective servers, and a single set of master credentials for authenticating the user to the second operating environment; and establishing a secure communication session between the user computer and a given server under control of a program running in the second operating environment, by authenticating the user in the second operating environment using the master credentials and, responsively to successfully authenticating the user, automatically selecting one of the server-specific credentials in the second operating environment and authenticating the user to the given server using the selected server-specific credentials.

In some embodiments, the method includes conducting the secure communication session with the given server responsively to successfully authenticating the user computer to the given server.

In an embodiment, the second operating environment is isolated from the first operating environment such that the general-purpose operations performed in the first operating environment do not affect operation of the second operating environment, and running the second operating environment includes verifying a trustworthiness of the second operating environment by communication between the second operating environment and a Central Management System (CMS) that is external to the user computer.

Establishing the secure communication session may include authenticating the user to the given server using the selected server-specific credentials only upon successfully verifying the trustworthiness of the second operating environment by the CMS.

In an embodiment, storing the server-specific credentials includes providing at least one of the server-specific credentials to the CMS, and sending the at least one of the server-specific credentials from the CMS to the user computer for storage in the second operating environment. Providing the at least one of the server-specific credentials may further include providing a security policy of at least one of the servers to the CMS, and enforcing the security policy with respect to the second operating environment by the CMS. Additionally or alternatively, storing the server-specific credentials may include providing at least one of the server-specific credentials to the user computer independently of the CMS.

In another embodiment, the master credentials are uniquely associated with the user computer, and authenticating the user using the master credentials includes verifying that the user computer matches the master credentials. In still another embodiment, storing the server-specific credentials includes encrypting the server-specific credentials, and authenticating the user to the given server using the selected server-specific credentials includes decrypting the selected credentials. In an embodiment, storing the master credentials includes encrypting the master credentials, and authenticating the user using the master credentials includes decrypting the master credentials.

In some embodiments, storing the server-specific credentials includes storing a self-contained data element including one of the server-specific credentials and a software application that is to run in the second operating environment for communicating with a respective one of the servers. The self-contained data element may further include attributes of the software application. In an embodiment, the self-contained data element includes the master credentials, the multiple server-specific credentials and respective multiple software applications for communicating with the servers.

In some embodiment, establishing the secure communication session includes, in response to successfully authenticating the user to the given server, causing a packet filter of the given server to allow packets arriving from the user computer to reach the given server.

There is additionally provided, in accordance with an embodiment of the present invention, a user computer, including:

an interface, which is operative to communicate with multiple servers over a communication network; and a processor, which is coupled to run a first operating environment, which is configured to perform general-purpose operations, and a second operating environment, which is configured exclusively for interacting with the multiple servers in respective protected communication sessions and is isolated from the first operating environment, to store in the second operating environment multiple server-specific credentials for authenticating a user of the user computer to the respective servers and a single set of master credentials for authenticating the user to the second operating environment, and to establish a secure communication session between the user computer and a given server under control of a program running in the second operating environment, by authenticating the user in the second operating environment using the master credentials and, responsively to successfully authenticating the user, automatically selecting one of the server-specific credentials in the second operating environment and authenticating the user to the given server using the selected server-specific credentials.

There is further provided, in accordance with an embodiment of the present invention a computer software product for use in a user computer, the product including a computer-readable medium, in which instructions are stored, which instructions, when executed by the user computer, cause the user computer to communicate with multiple servers over a communication network, to run a first operating environment for performing general-purpose operations, to run a second operating environment, which is configured exclusively for interacting with the multiple servers in respective communication sessions and is isolated from the first operating environment, to store in the second operating environment multiple server-specific credentials for authenticating a user of the user computer to the respective servers and a single set of master credentials for authenticating the user to the second operating environment, and to establish a secure communication session between the user computer and a given server under control of a program running in the second operating environment, by authenticating the user in the second operating environment using the master credentials and, responsively to successfully authenticating the user, automatically selecting one of the server-specific credentials in the second operating environment and authenticating the user to the given server using the selected server-specific credentials.

The present invention will be more fully understood from the following detailed description of the embodiments thereof, taken together with the drawings in which:

DETAILED DESCRIPTION OF EMBODIMENTS

Overview

Figure 1:
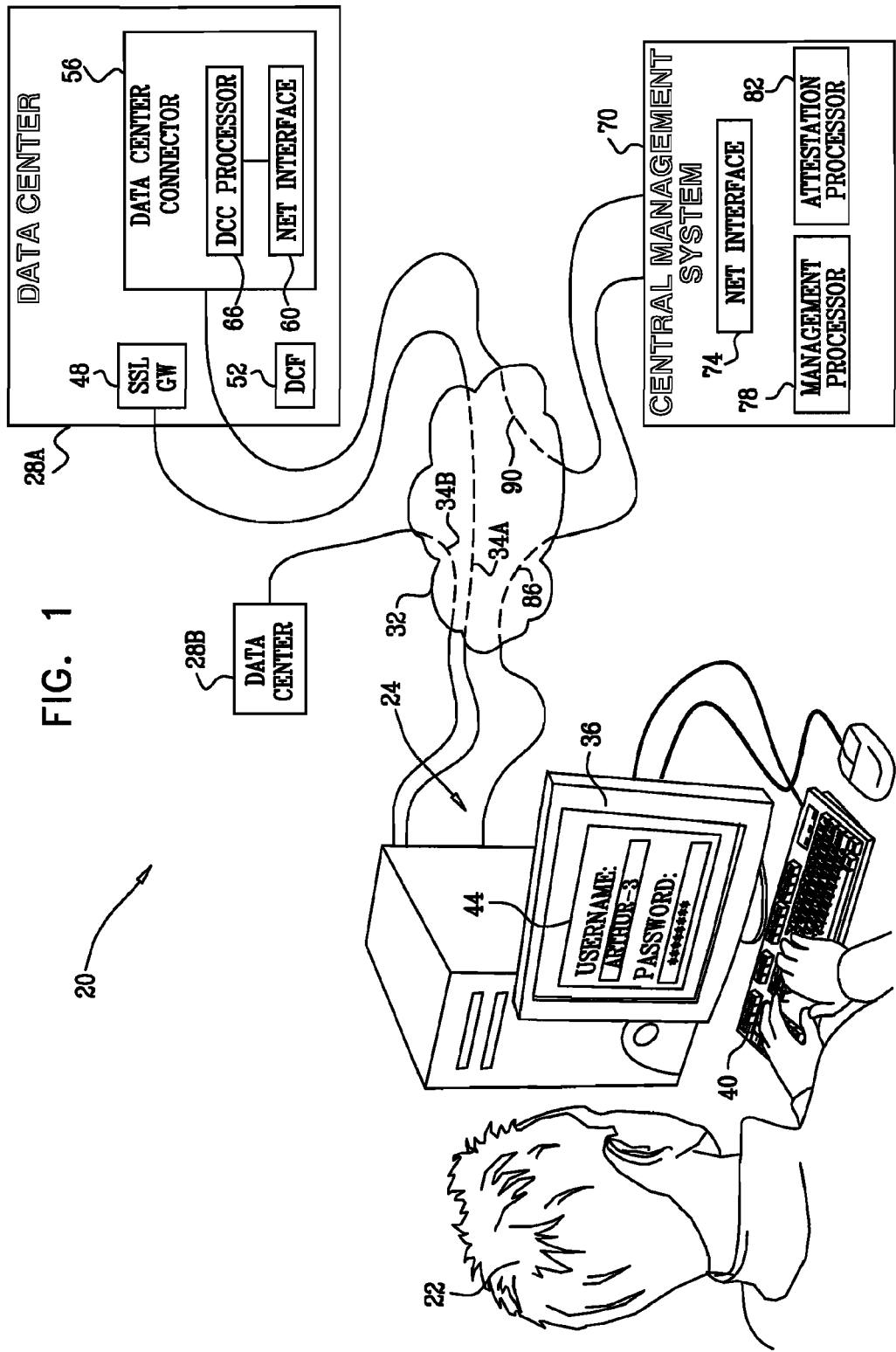
FIG. 1 is a block diagram that schematically illustrates a system for secure communication, in accordance with an embodiment of the present invention.

Establishing communication between a user computer and a server typically involves authenticating the user using a certain set of credentials, such as a username-password pair. In many cases, a certain user has multiple different credentials, which are used for authentication with different servers. For example, a user may have one set of credentials for logging in to his e-mail account, another set of credentials for logging in to his bank web portal, and yet another set of credentials for purchasing from a given e-commerce web site. Some users may have dozens of different credentials for authentication with different servers.

Users often find it difficult to define, remember and use a large number of different credentials. Some users simplify this task by using simple, easy-to-remember credentials. Some users write the credentials on paper, and other users use the same credentials with different servers. All of these examples demonstrate that the complexity of managing a large set of credentials ultimately results in reduced-quality credentials and/or increased security risks.

Embodiments of the present invention provide improved methods and systems for enabling a user to maintain multiple credentials for use with multiple different servers, while still having to remember and enter only a single set of credentials. The feature of accessing multiple different servers or applications with a single set of credentials is commonly known as "single sign-on."

In some embodiments that are described hereinbelow, the user computer runs two operating environments, which are referred to herein as a General-Purpose Operating Environment (GPOE) and a Trusted Operating Environment (TOE). The GPOE performs general-purpose operations of the user computer. The TOE, on the other hand, is configured exclusively for conducting protected communication sessions with protected servers. Typically, the TOE is isolated from the GPOE and its trustworthiness is verified by an external Central Management System (CMS).

The TOE stores multiple sets of server-specific credentials, for authenticating the user to respective predefined protected servers. The TOE also stores a single set of master credentials, which are used for authenticating the user to the TOE.

In order to establish a secure communication session with one of the predefined protected servers, the TOE carries out a two-stage authentication process. First, the user authenticates with the TOE by providing the master credentials. Upon successful authentication of the user's identity, the TOE automatically selects the appropriate server-specific credentials and authenticates the user to the server using the selected credentials.

Thus, by using the methods and systems described herein, the user is able to use any desired number of different credentials with different servers, while having to remember and provide only a single set of credentials. Since the trustworthiness of the TOE is continually assessed by the CMS, the credentials stored in the TOE and provided to the servers can be regarded as trustworthy, as well.

Moreover, in some embodiments the master credentials are local, i.e., uniquely associated with a particular user computer. In these embodiments, the master credentials are valid only when used from the particular user computer with which they are associated. Thus, even if the master credentials are disclosed to an illegitimate party, they cannot be used for authentication from other computers.

Some known authentication methods store and manipulate security credentials in the general-purpose operating environment. Unlike these methods, the methods and systems described herein store and use credentials from within the isolated TOE, whose trustworthiness is continually assessed by a trusted external entity (the CMS). Thus, the immunity of the user computer against password theft and other security threats is considerably enhanced. The enhanced security provided by the disclosed methods and systems enables organizations to deploy extranet applications with improved cost-effectiveness, ease-of-use and user satisfaction and with reduced risk of attack or information leakage.

System Description

FIG. 1 is a block diagram that schematically illustrates a system 20 for secure communication, in accordance with an embodiment of the present invention. In system 20, a user 22 operating a user computer 24 interacts with one or more servers, also referred to as data centers. In the present example, the user interacts with two data centers 28A and 28B. For example, the user may access his bank account using one server, log in to his e-mail account using another server, carry out an e-commerce transaction with yet another server, and/or interact with different servers in order to conduct any other type of communication session.

The interaction of user computer 24 with data centers 28A and 28B is controlled and protected using methods that are described in detail below. Data centers 28A and 28B are sometimes referred to herein as protected data centers. The protected data centers may comprise, for example, e-commerce web-sites, computer systems of financial institutions or other organizations, database servers, web sites in which the user has personal accounts and/or any other suitable computing platforms that interact with users and whose interaction with the users involves authentication. Each data center may comprise one or more computing platforms. Users may comprise, for example, customers, suppliers, employees or partners of the organization operating a given data center. Although FIG. 1 shows a single user and two data centers for the sake of clarity, a typical system comprises multiple users and multiple servers that are active at any given time.

User computer 24 and data centers 28A and 28B communicate over a communication network 32, via respective secure connections 34A and 34B. Network 32 may comprise a Wide Area Network (WAN), such as the Internet, a Metropolitan Area Network (MAN), a Local Area Network (LAN), a wired or wireless data network, or any other suitable network or combination of network types. Typically, at least part of network 32 is public.

User computer 24 may comprise a personal computer, a mobile computing/communication device or any other suitable user terminal. In the context of the present patent application and in the claims, the term "user computer" is used broadly and refers to any type of computing platform that is capable of communicating over a network. Computer 24 comprises a display 36 for displaying information to user 22, and an input device, such as a keyboard 40 or a mouse, for receiving user input. The internal structure of computer 24 is described in greater detail in FIG. 2 below. In particular, the user computer runs two separate operating environments, referred to as a General-Purpose Operating Environment (GPOE) and a Trusted Operating Environment (TOE).

User 22 interacts with each data center in a protected communication session. In order to initiate the secure session, the user computer authenticates with the data center by providing a certain set of credentials, such as a certificate or a username-password pair. Typically, the same user has different sets of credentials for authenticating with different data centers. The credentials that are used for authenticating the user vis-à-vis a particular data center are referred to herein as server-specific credentials. Nevertheless, using methods that are described in detail hereinbelow, user 22 need not remember and enter the server-specific credentials. Instead, the user enters only a single set of credentials, regardless of the server with which the session is initiated. This single set of credentials is referred to herein as master credentials 44.

Secure connections 34A and 34B, which connect user computer 24 with data centers 28A and 28B, may comprise connections that use the well-known Secure Sockets Layer (SSL) protocol. Each data center typically comprises an SSL Gateway (SSL GW) 48, which terminates the SSL connection at the data center end, and is able to allow or deny connection to the data center. Typically but not necessarily, users connect to the data center by connecting to a web server of the data center and accessing a web portal using a web browser. The SSL GW and web server may comprise separate computing platforms or be integrated in a single platform. In some embodiments, the data center comprises a Data Center packet Filter (DCF) 52, which filters packets arriving at the data center.

In some embodiments, system 20 comprises a Central Management System (CMS) 70, which monitors, configures and controls the TOE of computer 24. CMS 70 comprises a network interface 74, which is connected to network 32. The CMS typically comprises a management processor 78, which carries out the monitoring, control and configuration functions of the CMS and an attestation processor 82, which carries out attestation tests on the user computers.

The CMS communicates with the TOE of the user computer over network 32 using a secure connection 86, such as an SSL connection. The CMS monitors the TOE and attempts to detect situations in which the TOE has been corrupted or modified. The CMS reports the monitoring results to the data center. Since the exclusive task of the TOE is communicating with the data center, and since it typically has a fixed configuration, reliable detection of deviations from normal behavior, configuration and/or performance is feasible.

Some data centers may be connected to the CMS, and others may not. System operation with these two types of data centers is addressed below. In the example of FIG. 1, data center 28A is connected to the CMS, whereas data center 28B is not. Data center 28A comprises a Data Center Connector (DCC) 56, which serves as an interface between the CMS and the data center. The DCC communicates with the CMS over network 32 using a secure connection 90, such as an SSL connection. In addition to serving as an interface, the DCC sometimes maintains policies that define how different TOEs are treated by the data center as a function of their trustworthiness, as monitored and reported by the CMS.

DCC 56 comprises a network interface 60 for communicating over network 32, and a DCC processor 66 that carries out the different DCC functions. In some embodiments, DCC 56 comprises a hardware/software unit that is separate from the data center. Alternatively, the functions of the DCC can be embodied in one or more processors of the data center. The DCC may participate in provisioning of certificates and may enable minor changes in the web portal accessed by the users.

Although FIG. 1 shows two data centers and a single user computer, this configuration was chosen purely for the sake of conceptual clarity. In some embodiments, the methods and systems described herein can be carried out exclusively by the user computer and data center. Thus, CMS 70 may be omitted in some system configurations. In alternative embodiments, a particular CMS may control multiple user computers. Additionally or alternatively, a particular CMS can operate with multiple data centers or other servers. In some case, each data center belongs to a different organization. In other cases, a certain organization may operate multiple data centers.

Figure 2:
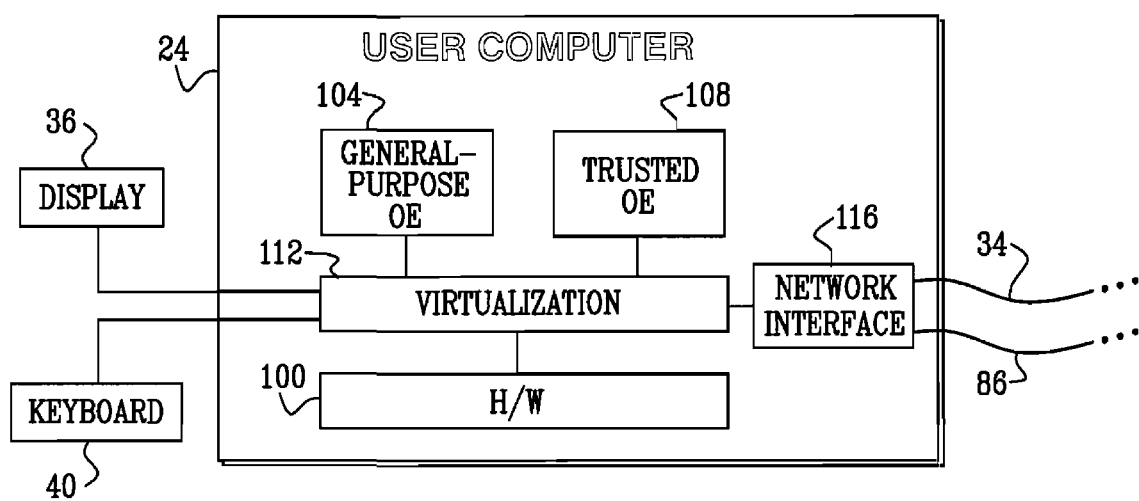
FIG. 2 is a block diagram that schematically illustrates a user computer, in accordance with an embodiment of the present invention.

FIG. 2 is a block diagram that schematically illustrates user computer 24, in accordance with an embodiment of the present invention. Computer 24 comprises hardware 100, typically comprising a processor that carries out the methods described herein, memory devices and any other suitable components or subsystems normally found in computing platforms. The computer comprises a network interface 116, which connects the computer with network 32, such as for communicating with data center 28 and/or CMS 70.

Computer 24 (or, more accurately, the processor in hardware 100) runs two operating environments in parallel. A Trusted Operating Environment (TOE) 108 is configured exclusively for communicating with the protected data centers. A General-Purpose Operating Environment (GPOE) 104 runs the different applications of the computer other than the protected data center applications. For example, in some embodiments the GPOE comprises a Microsoft® Windows® operating system, and the TOE comprises a Linux® operating system that runs a Firefox® browser. Alternatively, any other suitable operating system, such as Apple® Mac OS®, can also be used.

GPOE 104 and TOE 108 are decoupled, or isolated, from one another. In other words, the behavior, configuration and performance of one operating environment have little or no effect on the behavior, configuration and performance of the other. In particular, the performance and behavior of the TOE is insensitive to the operation of the GPOE. In some embodiments, the configuration of the TOE may not be entirely fixed, and the TOE may perform certain tasks other than communication with the data center. Thus, the terms "fixed configuration" and "configured exclusively for interacting with the data center" are meant to describe a situation in which the effect of any additional tasks carried out by the TOE is sufficiently minor, such that the TOE configuration is sufficiently fixed to allow reliable detection of anomalous behavior or performance.

Computer 24 comprises a virtualization layer 112, which controls the hardware resources and other resources of computer 24, and allocates the resources to the GPOE and TOE. Any suitable virtualization means, which may be implemented in hardware and/or software, can be used for this purpose. Although the computer configuration of FIG. 2 shows a single TOE for communicating with the different protected data centers, computer 24 may alternatively run two or more TOEs, which are decoupled from one another and from the GPOE, for securely connecting to multiple separate data centers.

Typically, hardware 100 of user computer 24, processors 78 and 82 of CMS 70 and DCC processor 66 of DCC 56 comprise general-purpose processors, which are programmed in software to carry out the functions described herein. The software may be downloaded to the processors in electronic form, over a network, for example, or it may alternatively be supplied to the processors on tangible, computer-readable media, such as CD-ROM. In particular, the TOE configuration may be distributed to the user computer as software code on suitable tangible media. For example, the user may be provided with tangible storage media storing a self-extracting file, which comprises a pre-configured Linux operating system and a Firefox browser that is pre-configured for exclusive communication with a given data center.

Additional aspects of implementing security features using computers that run trusted operating environments are described in PCT Publication WO 2008/018055, entitled "Extranet Security," filed Jul. 31, 2007, whose disclosure is incorporated herein by reference.

Performing Secure Local Single Sign-On

In many cases, user 22 has multiple different credentials, which are used for authentication with different servers or data centers. For example, one set of credentials may be used for logging in to the user's e-mail account, another set of credentials may be used for performing financial transactions via an Internet portal of the user's bank, and other sets of credentials may authenticate the user vis-à-vis different e-commerce sites. As explained above, however, the complexity of managing multiple different credentials typically results in reduced-quality credentials and/or increased security risks.

Embodiments of the present invention provide improved methods and systems for enabling a user to maintain multiple credentials for use with multiple different servers, while still having to remember and enter only a single set of credentials.

In some embodiments, server-specific credentials are stored in the TOE of the user computer. Each set of server-specific credentials is used for authenticating the user to a given predefined protected server. In addition, the TOE stores a single set of credentials, referred to as master credentials, which are used for authenticating the user to the TOE. In order to establish a secure communication session with one of the predefined protected servers, the TOE carries out a two-stage authentication process, which first authenticates the user using the master credentials, and then automatically authenticates the user with the desired protected server using the appropriate server-specific credentials. Since the trustworthiness of the TOE is continually assessed by the CMS, the credentials stored in the TOE and provided to the servers can be regarded as trustworthy, as well.

Figure 3:
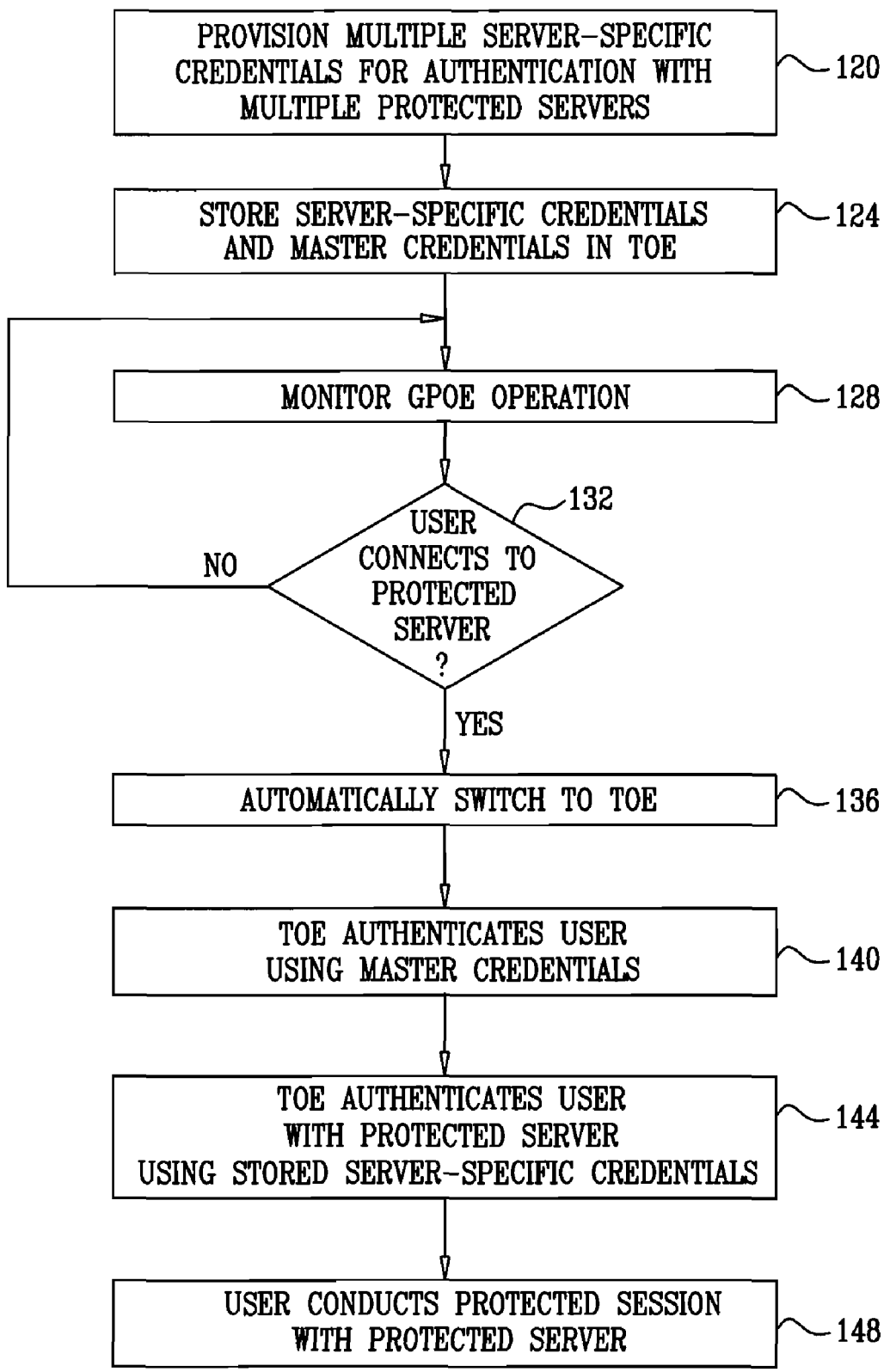
FIG. 3 is a flow chart that schematically illustrates a method for performing secure local single sign-on, in accordance with an embodiment of the present invention.

FIG. 3 is a flow chart that schematically illustrates a method for performing secure local single sign-on, in accordance with an embodiment of the present invention. The method begins by provisioning users to access multiple protected servers, at a provisioning step 120. For each protected server, provisioning a user comprises predefining server-specific credentials that, when provided by the user, verify the user's identity to the server. Any suitable type of security credentials known in the art can be used as server-specific credentials, such as, for example, various kinds of personal certificates, username-password schemes, secure tokens, biometric schemes and/or smartcards.

The TOE of the user computer stores the multiple server-specific credentials, at a credentials storage step 124. The TOE also stores a single set of master credentials, using which the user authenticates with the TOE. The master credentials may comprise any suitable type of credentials known in the art.

Typically, the TOE secures the stored server-specific and master credentials, such as by encrypting them prior to storage. Although the TOE provides real time protection of the stored credentials, the credentials may be retrieved from the user computer using other means. For example, the computer or its hard disk may be stolen and read not via the TOE. Encryption is used to protect the stored credentials against such scenarios.

During operation of the user computer, the computer monitors the operation of the GPOE, at a monitoring step 128. The computer checks whether the user attempts to initiate a secure communication session with one of the predefined protected servers, at a checking step 132. The user may initiate the secure session, for example, by typing a Uniform Resource Locator (URL) of a predefined protected server in the GPOE browser, by using a shortcut of the GPOE operating system, by selecting an entry from a "favorites" menu or by clicking a hyperlink in a certain web page.

If no secure session initiation is detected, the method loops back to step 128 above, to continue monitoring the GPOE. If, on the other hand, an initiation of a secure session is detected, the user computer automatically switches operation from the GPOE to the TOE, at a switching step 136. Certain additional aspects of detecting session initiation attempts and of switching between the GPOE and TOE are addressed in PCT Publication WO 2008/018055, cited above.

Having switched to the TOE, the TOE authenticates the user by requesting the user to enter the master credentials, at a master authentication step 140. If the user fails to provide the correct master credentials, authentication fails and the method terminates. If the user does provide the correct master credentials, the TOE automatically authenticates with the protected server, at a server-specific authentication step 144. The TOE selects the server-specific credentials corresponding to the protected server with which the user initiated the secure session, from among the stored sets of server-specific credentials. The TOE then automatically authenticates with the server on behalf of the user using the selected server-specific credentials.

When the TOE contacts the protected server, the server requests the server-specific credentials (e.g., a password or a personal certificate with which the user was provisioned). Typically, the server-specific credentials are delivered to the server only when the TOE is proven to be trustworthy. As noted above, the CMS continuously assesses the trustworthiness of the TOE. The TOE provides the requested credentials only if the TOE is currently regarded as trustworthy by the CMS.

After server-specific authentication is completed, the user computer goes on to establish and conduct the secure session with the desired protected server, at a server interaction step 148. Although the description above refers to sessions that are conducted via the TOE, sessions may also be conducted via the GPOE.

In some embodiments, the data center notifies the data center packet filter of the successful authentication. In response to the notification, the packet filter allows data packets arriving from the authenticated user computer to pass and reach the data center. Notifications to the data center packet filter can also be sent by the CMS.

Thus, the method of FIG. 3 enables the user to remember and provide only the master credentials, whereas authentication with the different servers using the server-specific credentials is carried out automatically by the TOE. Since the trustworthiness of the TOE is continuously assessed by the external CMS, the TOE is regarded as a safe location for storing security credentials, and the credentials stored in the TOE can thus be trusted.

Moreover, in some embodiments, the master credentials are predefined as local, i.e., uniquely associated with the particular user computer. In these embodiments, the master credentials are valid only if provided on the same machine (user computer) for which they are defined. When using this technique, even if the master credentials are disclosed (intentionally or unintentionally) to an illegitimate party, they are useless when entered at another computer. In order to authenticate successfully, the illegitimate party needs to obtain the master credentials, as well as gain physical access to the computer for which they were defined. Thus, the locality of the master credentials provides protection against "phishing" attacks and other password theft schemes.

In some embodiments, the user provisioning process is carried out in coordination between the server and the CMS. In these embodiments, the server issues a set of credentials for the user and provides these credentials to the CMS. The CMS provides the credentials to the user computer. In addition to credentials, the server may define various security policies, which are enforced and/or propagated to the user computers by the CMS. Such schemes may be used, for example, when the organization operating the server has a suitable business relationship with the organization operating the CMS. In alternative embodiments, user provisioning can be carried out directly between the user computer and the server, without involving the CMS. Such schemes may be used, for example, with legacy servers that do not support CMS interfaces, and in situations in which there is no cooperation between the organization operating the server and the organization operating the CMS.

In some embodiments, a given user may be provisioned with one or more servers in coordination with the CMS, and with one or more other servers directly. FIG. 1 above, for example, shows a configuration in which one data center is connected to the CMS and another data center is not.

In some embodiments, the CMS carries out various management functions with regard to the server-specific credentials. For example, the type of user provisioning performed and the desired authentication process may vary from one protected server to another. The applicable policy of each server may be stored in the CMS and applied to the TOEs of user computers that are provisioned to access the server.

As another example, different servers may have different updating policies with regard to security credentials. A given server may request that passwords be changed every three months. Another server may not impose such a requirement, or specify a different updating period. In some embodiments, the CMS stores and manages the different credentials management policies of the different servers. The user may be notified of the changes or asked for permission to perform them. Such notifications and requests are initiated by the CMS and propagated to the TOEs of the applicable user computers.

The CMS may store and enforce policies that apply to the master credentials, as well. For example, the locality of the master credentials may be switched on and off, or defined in different ways. Such locality policies may be managed by the CMS.

In some embodiments, the user computer is provisioned to use a certain application and/or certain attributes for establishing and conducting a secure session with a certain protected server. Different protected servers may use different applications and/or attributes on the user computer side.

For example, consider a user computer that is provisioned to access two protected servers. One server comprises a web site providing Internet services, and the other server comprises a corporate site that provides financial services to customers. In order to connect to the first server, the TOE is provisioned to use a particular Internet browser having a predefined configuration with fixed communication settings. The browser configuration may also define one or more server-specific "cookies." Secure connection with the second server, on the other hand, is performed using a dedicated Java™ application that uses a specific version of a Java Virtual Machine (JVM) and one or more associated libraries.

In some embodiments, the TOE stores a self-contained data element, which serves as a digital identity of the user for each protected server. The self-contained data element comprises the server-specific credentials for accessing the server and the software application (e.g., browser) to be used for connecting to the server, and may comprise additional attributes (e.g., policies and/or data) for use in connecting to the servers. The TOE typically secures each "digital identity," such as using encryption. Using this technique, a composite digital identity can be transferred from one computer to another, backed-up or otherwise manipulated as a single data element.

In some embodiments, a set of composite digital identities of a given user, along with the master credentials of this user, are managed as a single composite data element. When the user initiates connection to a protected server, the TOE verifies the user's identity using the master credentials, retrieves and decrypts the appropriate digital identity, and then connects to the server using the application, attributes and server-specific credentials specified in the retrieved identity. If the user requests to connect to another protected server, the TOE retrieves and applies the digital identity defined for the other server. In some embodiments, the TOE may request the user to re-authenticate using the master credentials, such as after a predetermined idle period.

Although the embodiments described herein mainly address extranet applications in which communication is transported over public networks, the principles of the present invention can also be used for enhancing the security of intranet applications in which communication is confined to a private network.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computing method, comprising:
   running on a user computer a first operating environment for performing general-purpose operations and a second operating environment, which is configured exclusively for interacting with multiple servers in respective secure communication sessions and is separate from the first operating environment, wherein the second operating environment is isolated from the first operating environment and the first operating environment does not interact with the multiple servers in the secure communication sessions, the first operating environment including an operating system and second operating environment including an operating system separate from the operating system of the first operating environment, wherein in the protected communication session the second operating environment exchanges transaction data with a server via a security protocol, wherein general-purpose operations performed in the first operating environment do not affect operation of the second operating environment, and wherein running the second operating environment comprises verifying a trustworthiness of the second operating environment by communication between the second operating environment and a Central Management System (CMS) that is external to the user computer;
   storing in the second operating environment multiple different server-specific credentials, each corresponding to one of the multiple servers, for authenticating a user of the user computer to each respective server, and a single set of master credentials for authenticating the user to the second operating environment; and
   establishing a secure communication session between the user computer and at least one of the multiple servers under control of a program running in the second operating environment, by authenticating the user to the second operating environment using the master credentials and, responsively to successfully authenticating the user in the second operating environment, automatically selecting one of the server-specific credentials in the second operating environment corresponding to the one of the multiple servers and the second operating environment authenticating the user to the one server using the selected server-specific credentials.

2. The method according to claim 1, and comprising conducting the secure communication session with the given server responsively to successfully authenticating the user computer to the given server.

3. The method according to claim 1, wherein establishing the secure communication session comprises authenticating the user to the given server using the selected server-specific credentials only upon successfully verifying the trustworthiness of the second operating environment by the CMS.

4. The method according to claim 1, wherein storing the server-specific credentials comprises providing at least one of the server-specific credentials to the CMS, and sending at least one of the server-specific credentials from the CMS to the user computer for storage in the second operating environment.

5. The method according to claim 4, wherein providing at least one of the server-specific credentials further comprises providing a security policy of at least one of the servers to the CMS, and enforcing the security policy with respect to the second operating environment by the CMS.

6. The method according to claim 1, wherein storing the server-specific credentials comprises providing at least one of the server-specific credentials to the user computer independently of the CMS.

7. The method according to claim 1, wherein the master credentials are uniquely associated with the user computer, and wherein authenticating the user using the master credentials comprises verifying that the user computer matches the master credentials.

8. The method according to claim 1, wherein storing the server-specific credentials comprises encrypting the server-specific credentials, and wherein authenticating the user to the given server using the selected server-specific credentials comprises decrypting the selected credentials.

9. The method according to claim 1, wherein storing the master credentials comprises encrypting the master credentials, and wherein authenticating the user using the master credentials comprises decrypting the master credentials.

10. The method according to claim 1, wherein storing the server-specific credentials comprises storing a self-contained data element comprising one of the server-specific credentials and a software application that is to run in the second operating environment for communicating with a respective one of the servers.

11. The method according to claim 10, wherein the self-contained data element further comprises attributes of the software application.

12. The method according to claim 10, wherein the self-contained data element comprises the master credentials, the multiple server-specific credentials and respective multiple software applications for communicating with the servers.

13. The method according to claim 1, wherein establishing the secure communication session comprises, in response to successfully authenticating the user to the given server, causing a packet filter of the given server to allow packets arriving from the user computer to reach the given server.

14. A user computer, comprising:
  an network interface device, which is operative to communicate with multiple servers over a communication network; and
  a hardware processor, which is coupled to run a first operating environment, which is configured to perform general-purpose operations, and a second operating environment, which is configured exclusively for interacting with the multiple servers in respective protected communication sessions and is separate from the first operating environment,
    wherein the second operating environment is isolated from the first operating environment and the first operating environment does not interact with the multiple servers in the secure communication sessions, the first operating environment including an operating system and second operating environment including an operating system separate from the operating system of the first operating environment,
    wherein in the protected communication session the second operating environment exchanges transaction data with a server via a security protocol,
    wherein general-purpose operations performed in the first operating environment do not affect operation of the second operating environment, and
    wherein running the second operating environment comprises verifying a trustworthiness of the second operating environment by communication between the second operating environment and a Central Management System (CMS) that is external to the user computer,
  the hardware processor configured to store in the second operating environment multiple different server-specific credentials, each corresponding to one of the multiple servers, for authenticating a user of the user computer to each respective server and a single set of master credentials for authenticating the user to the second operating environment, and
  the hardware processor configured to establish a secure communication session between the user computer and at least one of the multiple servers under control of a program running in the second operating environment, by authenticating the user to the second operating environment using the master credentials and, responsively to successfully authenticating the user in the second operating environment, automatically selecting, one of the server-specific credentials in the second operating environment corresponding to the one of the multiple servers and the second operating environment authenticating the user to the one server using the selected server-specific credentials.

15. The user computer according to claim 14, wherein the processor is coupled to conduct the secure communication session with the given server responsively to successfully authenticating the user computer to the given server.

16. The user computer according to claim 14, wherein the processor is coupled to authenticate the user to the given server using the selected server-specific credentials only when the trustworthiness of the second operating environment is successfully verified by the CMS.

17. The user computer according to claim 14, wherein the processor is coupled to receive at least one of the server-specific credentials from the CMS, and to store received at least one of the server-specific credentials in the second operating environment.

18. The user computer according to claim 14, wherein the processor is coupled to store at least one of the server-specific credentials independently of the CMS.

19. The user computer according to claim 14, wherein the master credentials are uniquely associated with the user computer, and wherein the processor is coupled to authenticate the user using the master credentials by verifying that the user computer matches the master credentials.

20. The user computer according to claim 14, wherein the processor is coupled to encrypt the stored server-specific credentials, and to decrypt the selected credentials so as to authenticate the user to the given server.

21. The user computer according to claim 14, wherein the processor is coupled to encrypt the stored master credentials, and to decrypt the master credentials so as to authenticate the user.

22. The user computer according to claim 14, wherein the processor is coupled to store a self-contained data element comprising one of the server-specific credentials and a software application that is to run in the second operating environment for communicating with a respective one of the servers.

23. The user computer according to claim 22, wherein the self-contained data element further comprises attributes of the software application.

24. The user computer according to claim 22, wherein the self-contained data element comprises the master credentials, the multiple server-specific credentials and respective multiple software applications for communicating with the servers.

25. A computer software product for use in a user computer, the computer software product comprising a non-transitory computer-readable storage medium, storing executable instructions, which instructions, when executed by the user computer, cause the user computer to perform operations including,
  communicating with multiple servers over a communication network, to run a first operating environment for performing general-purpose operations and a second operating environment, which is configured exclusively for interacting with the multiple servers in respective secure communication sessions and is separate from the first operating environment,
    wherein where the second operating environment is isolated from the first operating environment and the first operating environment does not interact with the multiple servers in the secure communication sessions, the first operating environment including an operating system and second operating environment including an operating system separate from the operating system of the first operating environment, wherein in the protected communication session the second operating environment exchanges transaction data with a server via a security protocol, wherein general-purpose operations performed in the first operating environment do not affect operation of the second operating environment, and wherein running the second operating environment comprises verifying a trustworthiness of the second operating environment by communication between the second operating environment and a Central Management System (CMS) that is external to the user computer, storing in the second operating environment multiple different server-specific credentials, each corresponding to one of the multiple servers, for authenticating a user of the user computer to each respective server and a single set of master credentials for authenticating the user to the second operating environment, and establishing a secure communication session between the user computer and at least one of the multiple servers under control of a program running in the second operating environment, by authenticating the user to the second operating environment using the master credentials and, responsively to successfully authenticating the user in the second operating environment, automatically selecting one of the server-specific credentials in the second operating environment corresponding to the one of the multiple servers and the second operating environment authenticating the user to the one server using the selected server-specific credentials.

* * * * *